US008774881B2

(12) United States Patent
Johnson

(10) Patent No.: US 8,774,881 B2
(45) Date of Patent: Jul. 8, 2014

(54) MOBILE TELEPHONE CLEANING CASE

(76) Inventor: Gavin A. Johnson, East Wenatchee, WA (US)

( * ) Notice: Subject to any disclaimer, the term of this patent is extended or adjusted under 35 U.S.C. 154(b) by 445 days.

(21) Appl. No.: 13/154,363

(22) Filed: Jun. 6, 2011

(65) Prior Publication Data
US 2012/0309475 A1 Dec. 6, 2012

(51) Int. Cl.
H04W 24/00 (2009.01)

(52) U.S. Cl.
USPC .............. 455/575.8; 455/575.1; 455/575.3

(58) Field of Classification Search
None
See application file for complete search history.

(56) References Cited

U.S. PATENT DOCUMENTS

| 6,968,056 | B2* | 11/2005 | Barnett et al. | 379/433.13 |
| 7,082,318 | B2* | 7/2006 | Wilson | 455/550.1 |
| D582,149 | S | 12/2008 | Tan | |
| 7,593,524 | B2* | 9/2009 | Maenpaa | 379/433.13 |
| 2004/0166910 | A1 | 8/2004 | Ha et al. | |
| 2004/0266496 | A1* | 12/2004 | Kauhaniemi et al. | 455/575.1 |
| 2006/0198513 | A1* | 9/2006 | Eldon | 379/433.13 |
| 2008/0257921 | A1 | 10/2008 | Chauhan | |
| 2008/0300031 | A1* | 12/2008 | Cho et al. | 455/575.3 |
| 2009/0114556 | A1 | 5/2009 | Tai et al. | |
| 2009/0186264 | A1 | 7/2009 | Huang | |
| 2012/0088558 | A1* | 4/2012 | Song | 455/575.1 |
| 2012/0138490 | A1* | 6/2012 | Hollander et al. | 206/205 |
| 2012/0309475 | A1* | 12/2012 | Johnson | 455/575.8 |

FOREIGN PATENT DOCUMENTS

| JP | 11299521 | 4/1998 |
| JP | 2008042337 | 2/2008 |
| WO | 2009135255 | 11/2009 |

* cited by examiner

Primary Examiner — Charles Shedrick
(74) Attorney, Agent, or Firm — Patrick J. S. Onouye; Krista A. Wittman

(57) ABSTRACT

A mobile telephone cleaning case is provided. An open face top cover has a substantially flat back platform with raised sides along three of four edges and is dimensioned to receive a mobile device. A bottom cover includes a further back platform with further raised sides along three of four edges and that is rotatably affixed to the fourth edge of the open face cover via a connecting member such that the raised sides interconnect with the further raised sides. A microfiber cloth is affixed to a continuous back surface formed by the back platform and the further back platform.

20 Claims, 7 Drawing Sheets

MOBILE TELEPHONE CLEANING CASE

FIELD

The invention relates in general to mobile telephone cases and, specifically, to a mobile telephone case that cleans a mobile telephone display screen.

BACKGROUND

As mobile telephone use increases, companies are constantly working to provide users with smarter phones by providing and updating new features, such as Internet capability, bigger display screens, and touch screens. For example, display size has increased from around 3 cm to 9 cm within the past 30 years. As well, touch screens provide and display an interactive command system for users to access information and make telephone calls by pressing key points displayed on the screen with their finger. Mobile telephones with such features are costly, and owners and users of these phones are becoming more and more concious about protecting their phones due to high replacement costs.

Mobile telephone cases are becoming increasingly popular because they provide protection and prevent a mobile phone from becoming scratched, dented, cracked, or otherwise damaged, which in turn devalues the phone. There are numerous types and designs for mobile phone cases that differ based on material, design, and cost. Many mobile phone cases either have a single case that forms to the mobile phone itself or includes two or more pieces that interconnect to provide a cover for the back and sides of the phone. The single piece case can be difficult to put on and remove from the phone due to the sturdy, but inflexible material used to form the case, while pieces of the two-piece case can be lost. Additionally, many single piece cases are cumbersome and require users to remove the case prior to charging the phone. Both designs tend to leave the face of the phone open and freely accessible so that users can access the display, especially touch screen displays. Based on the open face design of the phone cases, touch screens and display screens easily become dirty from environmental debris, and from finger, ear, cheek, and other prints obtained during use of the mobile phone in everyday life.

Generally, mobile phone cases serve to encase and protect the mobile phone without providing room to carry mobile phone accessories, such as cleaning supplies. Due to a lack of available cleaning supplies, users often find and use substitutes, such as jeans, t-shirts, or shirt sleeves, for example. Improper and substitute cleaning materials can harm or scratch the display screen and even prevent the touch screen display of commands from working.

Accordingly, there is a need for a mobile phone case that encases, protects, and houses a mobile telephone while providing proper cleaning supplies. Preferably, the mobile phone case will include a single piece, or one or more pieces that are affixed to one another to prevent loss of the pieces.

SUMMARY

A cleaning case for a mobile telephone is provided. The cleaning case includes a top cover and a bottom cover, which are rotatably affixed via pivot mounts and secured into a closed position via security members. A cleaning cloth is affixed on an inner surface of the mobile telephone case to allow easy and convenient cleaning of a telephone. For example, a user opens the cleaning case, removes the phone, and turns the phone upside down so that the face of the phone faces the inner surface of the cleaning case. Subsequently, the user slides the phone in and out of the cleaning case allowing the face of the telephone to rub against the cleaning cloth. Once finished, the user turns the phone over so that the face is positioned and inserts the phone into the case for storage.

A further embodiment provides a mobile phone cleaning case. An open face top cover has a back platform with raised sides along three of four edges and is dimensioned to receive a mobile device. A bottom cover includes a further back platform with further raised sides along three of four edges and that is rotatably affixed to the fourth edge of the top cover via a connector such that the raised sides interconnect and align with the further raised sides connecting member. A cleaning material, such as microfiber cloth, is affixed to the continuous unitary back platform formed by the top and bottom cover's back platform.

Other embodiments of the invention will become readily available and apparent to those skilled in the art from the following detailed description, wherein are described embodiments of the invention by way of illustrating the best mode contemplated for carrying out the invention are shown. As will be realized, the invention is capable of other and different embodiments and its several details are capable of modifications in various obvious respects, all without departing from the spirit and the scope of the invention. Accordingly, the drawings and detailed description are to be regarded as illustrative in nature and not as restrictive.

DETAILED DESCRIPTION

Conventionally, mobile telephone cases are designed to house and protect a mobile phone, while allowing users to access necessary parts and features to command general uses of the phone. For example, many cases leave an opening for the user to access a display on the phone, such as a touch screen display, which requires frequent cleaning due to environmental debris, as well as finger, ear, and cheek prints from the user. Due to a lack of available cleaning supplies, users often clean the display with the bottom of a t-shirt or a sleeve, which can cause scratches to form on the display.

Figure 1:
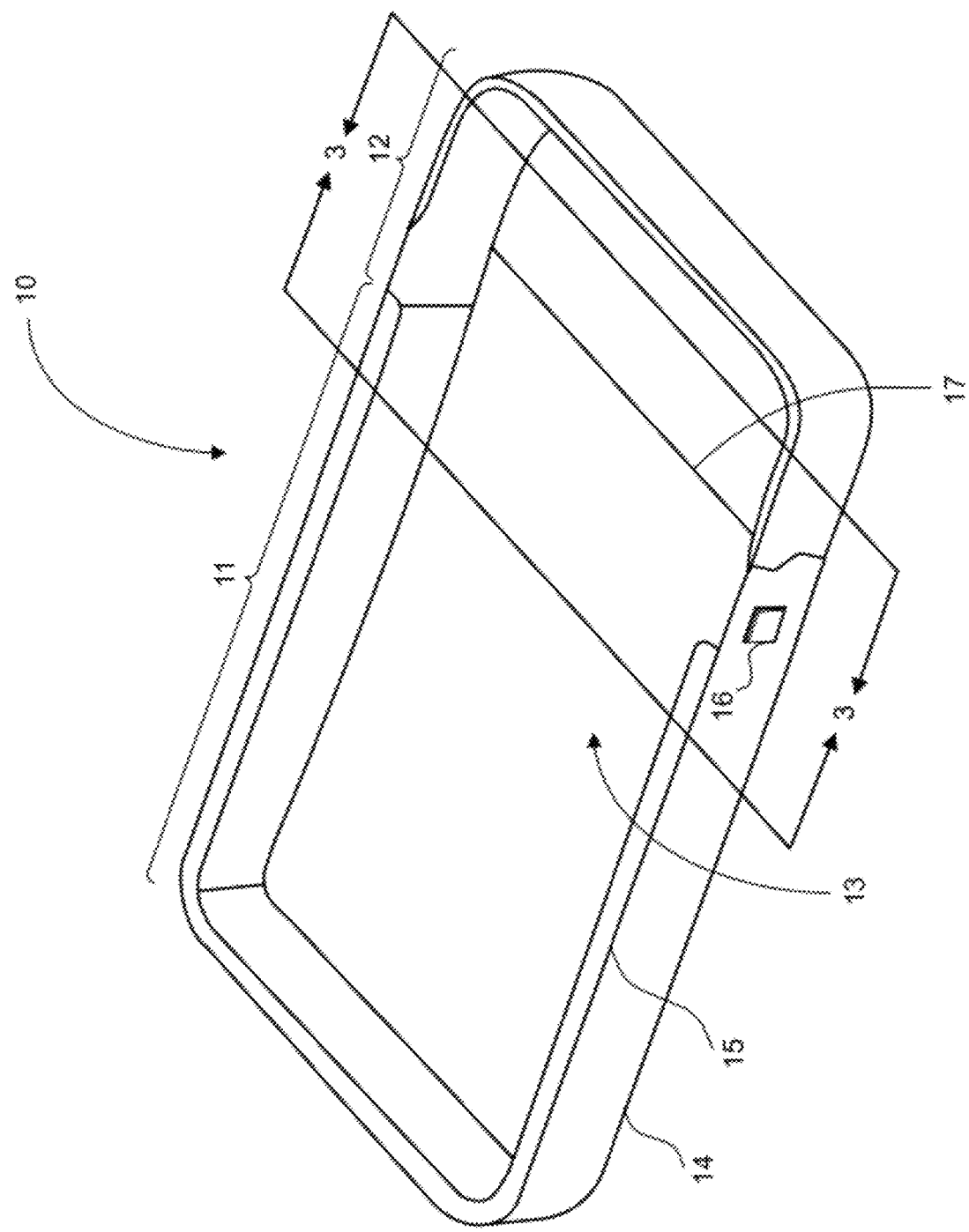
FIG. 1 is a perspective view showing a mobile telephone cleaning case, in accordance with one embodiment.

A mobile phone cleaning case allows users to protect and clean their phone with a single device. FIG. 1 is a perspective view showing a mobile telephone cleaning case 10, in accordance with one embodiment. The mobile phone case 10 includes a top cover 11 and a bottom cover 12 that can be movably interconnected via a pivot point created through the use of a connecting member (not shown). The top and bottom covers can each be made from material, including plastic, leather, neoprene, rubber, or canvas. Other materials for the top and bottom covers are possible.

The mobile phone cleaning case 10 includes a back platform 13 that is formed from a durable material, and shaped and sized to receive a mobile phone. Specifically, the length and width of the back platform 13 can be based on a type of mobile phone to be encased. Examples of different mobile phones include the iPhone manufactured by Apple, Inc. of Cupertino, Calif., the BlackBerry manufactured by Research In Motion Limited of Waterloo, Ontario, Canada, as well as mobile phones manufactured by Nokia of Keilaniemi, Espoo, Finland; Samsung of Samsung Town, Seoul, South Korea; HTC of Taoyuan, Taiwan, Republic of China; and Motorola of Schaumburg, Ill. Other mobile phones are possible. In one embodiment, the back platform can be formed from one or more individual parts and combined to form a unitary back platform, as further described below with reference to FIG. 2.

A wall 14 is perpendicularly affixed around a perimeter of the back platform 13. A height of the wall 14 is dependent upon the mobile phone, but should be tall enough to extend to or above a display, or front, face of the mobile phone. An overhang 15 is perpendicularly affixed along a portion of the wall 14, opposite the back platform 13. The overhang 15 extends over a portion of the mobile phone when positioned in the mobile phone case 10 to secure the mobile phone within the mobile phone cleaning case. The dimensions of the overhang can depend on the type of phone to be encased. In one embodiment, the dimensions of the mobile phone case 10 are 121.4 mm×64 mm×13.5 mm to encase, for example, an iPhone, while a width of the overhang is about 2 mm. Other dimensions are possible based on different mobile phones to be encased.

A cleaning cloth or material (not shown) covers a portion of or the entire back platform 13 to provide a user with proper and convenient cleaning equipment for the mobile phone. Specifically, the cleaning cloth is affixed to a top surface of the unitary back platform 13. In a further embodiment, the cleaning cloth is also affixed to and along the inner sides of the wall 14. The cleaning cloth can be made from material, including microfiber, cotton, and chamois, as well as other types of material, and can be affixed via an adhesive, including glue or tape made from solutions such as epoxies, polyurethanes, silicones, and plastisols. Other materials and adhesives for the cleaning cloth are possible. In one embodiment, a single cloth covers the inside of the mobile phone protective case. In a further embodiment, separate cleaning cloths cover the top 11 and bottom 12 cases. An example of how the cleaning cloth can be affixed to the covers is further described in detail below with respect to FIG. 3.

The top 11 and bottom 12 covers are interconnected and secured in a position to house, protect, and encase the mobile phone via at least one security member 16. In one embodiment, two security members are positioned across from one another and affixed to the wall 14. The security members 16 lock the top and bottom covers in a closed position conformably surrounding the mobile phone and can include buttons, locks, springs, or other fastening mechanisms. Other types of security members are possible, such as magnets. The security members are discussed in further detail below with respect to FIGS. 2 and 3.

When the security members 16 are in a locked position, the top and bottom covers are interconnected and secured to prevent movement of the mobile phone within the case. Generally, when the mobile phone cleaning case is not being used to clean the telephone display face, a back side of the mobile phone is positioned on top of the unitary back platform 13 of the mobile phone case 10 and the display of the mobile phone faces outward toward the user. The overhang 15 extends over a portion of the telephone display face when encased to prevent the mobile phone from moving.

To access the cleaning cloth, the user opens the mobile phone case 10 by applying pressure to the security members 16 and releasing the security members 16 from a locked position. After releasing the security members 16, the bottom cover 12 can rotate away from the top cover 11 by pivoting around an axis 17, while still remaining connected by a connecting member (not shown). After the bottom cover has rotated away from the top cover, the user is able to access a bottom portion of the phone and can remove the mobile phone from the mobile phone case 10 by sliding the phone out from the top cover 11 and under the overhang 15. The user then flips the phone over so that the display face of the phone now faces the back platform 13, which is covered by the cleaning material, such as a microfiber cloth. The user can then rub the display face of the phone over the cleaning material by sliding the phone in and out of the top cover 11. Specifically, the overhang 15 guides the display face of the phone along the cleaning cloth of the bottom platform 13. Once finished, the user again removes the phone from the top cover 11 and flips the phone over so that the display face is facing the user and the backside of the phone is positioned on the back platform 13 of the cleaning case 10. The display face of the phone is now accessible to the user. Subsequently, the user moves the bottom cover 12 into a closed position with the top cover 11 and locks the covers 11, 12 into place via the security members 16 to secure, enclose, and protect the mobile phone.

Figure 2:
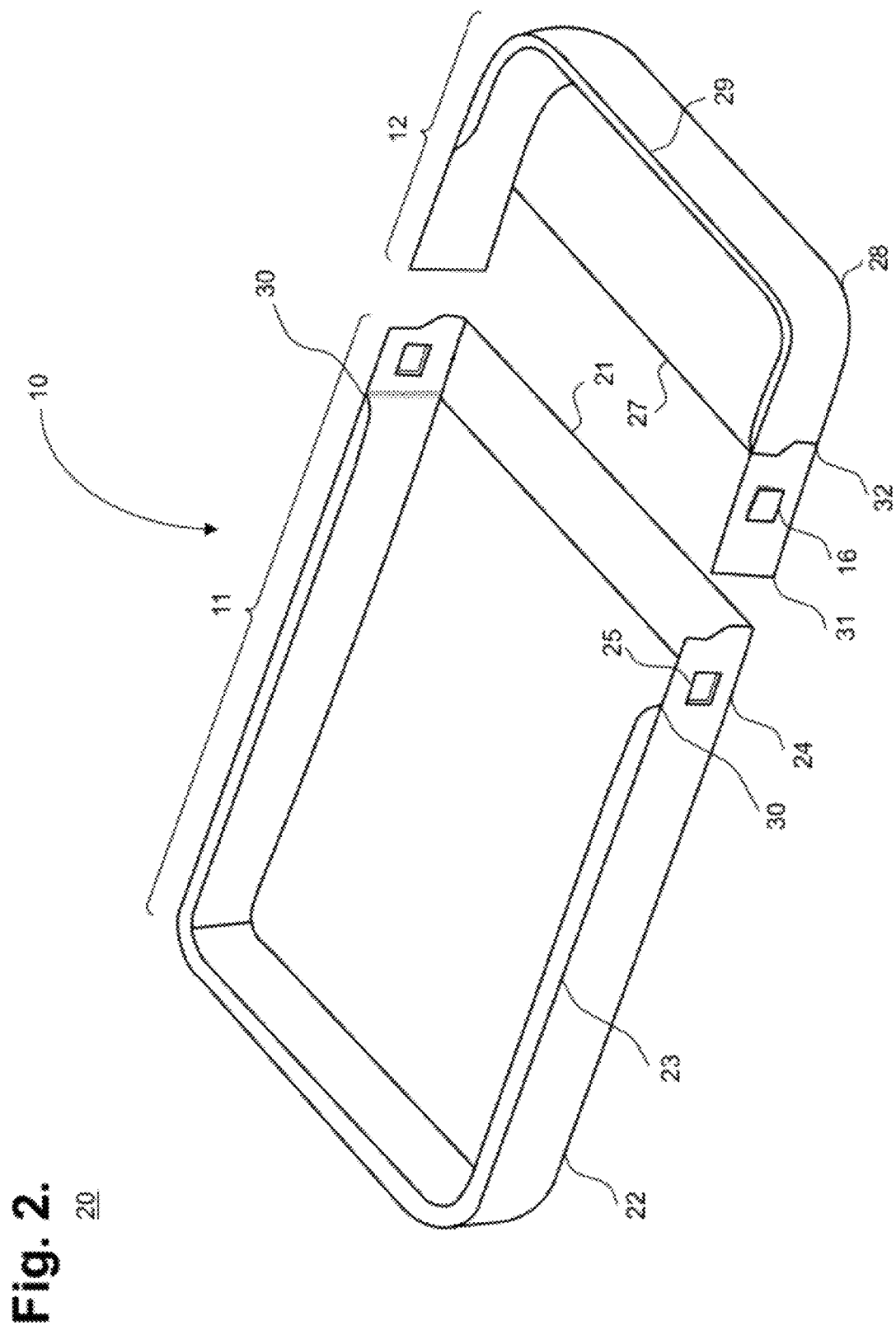
FIG. 2 is a perspective view showing top and bottom covers of the mobile telephone cleaning case of FIG. 1.

The top 11 and bottom 12 covers are each shaped to fit securely together in the locked position to conformably surround and protect the mobile phone. FIG. 2 is a perspective view showing top and bottom covers of the mobile telephone cleaning case of FIG. 1. The top cover 11 includes a back platform 21 that has a rounded end with two rounded corners and an opposite end with a straight edge. A size of the back platform 21 is dependent upon the size of the mobile phone to be encased. However, at a minimum, the back platform 21 should be large enough to support at least a portion of the mobile phone. In one embodiment, the back platform 21 of the top cover should be large enough to cover a portion of the phone measured from the top of the phone to a bottom of a display screen to ensure that the entire display is fully covered when the phone is inserted upside down in the top cover to be cleaned. For example, the back platform 21 for an iPhone cleaning case can have a length of 99.2 mm and a width of at least 58.6 mm. Other measurements are possible.

A U-shape wall 22 is perpendicularly affixed along a portion of the perimeter of the back platform 21. Specifically, the wall 22 originates at a point 30 on one side of the back platform 21 and extends along the perimeter around the first and second rounded corners to a further point 30 on the opposite side between the second rounded corner and the straight edge. The straight edge end of the back platform 21 remains open, without a wall. A height of the wall 22 is dependent on a depth of the mobile phone. However, at a minimum, the wall should be tall enough to extend to or above a top surface of the mobile device when positioned inside the cleaning case. In one embodiment, the height of the wall is 13.5 mm; however, other measurements are possible.

An overhang 23 is perpendicularly affixed to the wall 22, opposite the back platform 21. The overhang 23 extends from the wall over a top surface of the back platform 21. When encased, the overhang covers a portion of the mobile phone display face to secure the phone and prevent the phone from moving.

A receiving end 24 extends from each end of the wall 22, starting at the points 30, where the overhang 23 ends, and travels along the perimeter of the back platform 21 coincident with the outer surface of the wall 22 to the straight edge end. A width of each receiving end 24 is thinner than the width of the wall 22, forming a void between an inner surface of each receiving end 24 and the wall 22 to receive the bottom cover. The receiving ends 24 are tapered from top to bottom at the straight edge to interlock with oppositely tapered ends 31 of the bottom cover 12. At least one security cutout 25 is formed within one of or both the receiving ends 24. When the security cutout 25 is formed within each receiving end 24, the security cutouts 25 can be positioned across from one another. The cutouts 25 are sized and shaped to receive a security member 16 that is affixed to the bottom cover 12. In one embodiment, the cutouts 25 are each shaped as a square. However, other shapes, including rectangles, circles, triangles, and combined shapes are possible.

The top cover 11 can be interconnected to the bottom cover 12 to conformably surround and secure the mobile phone. The bottom cover 12 includes a back platform 27, a wall 28, and an overhang 29. The bottom cover back platform 27 can be made from a durable material and can have four sides shaped as a square or rectangle with one end having two rounded corners and a straight edge end. Other shapes of the back platform are possible. A U-shape wall 28 surrounds a portion of the back platform 27 of the bottom cover 12 to include three sides of the perimeter, leaving only the straight edge without a wall. Additionally, the overhang 29 is perpendicularly affixed to the wall 28, opposite the back platform 27. The overhang 29 extends from the wall 28 over a top surface of the back platform 27. When encased, the overhang 29 can cover a portion of the mobile phone display face to secure the phone and prevent the phone from moving. In one embodiment, an overhang 29 is perpendicularly affixed to the wall 28 of the bottom cover 12 and extends, for example, over a cleaning cloth covering an inner surface of the wall 28 but not over the mobile phone. In a further embodiment, no overhang is affixed.

When the mobile phone cleaning case is in a closed position, the straight edge of the bottom cover back platform 27 is positioned adjacent to the straight edge of the top cover back platform 21 to form a unitary back platform, as shown in FIG. 1. The top 11 and bottom 12 covers can be rotatably affixed via a connecting member (not shown). The connecting member is further discussed below with reference to FIG. 4. In a further embodiment, no connecting member is required, such as described below in further detail with reference to FIG. 7.

The back platform 27 of bottom cover 12 is sized based on the back platform 21 of the top cover 11. Returning to the above example, the back platform of the top cover is 99.2 mm, while the total length of an iPhone is 115.2 mm. Thus, the back platform of the bottom cover should be at least 16 mm to house the phone. However, the length of the bottom cover back platform can be longer to allow for the cleaning cloth. At a minimum, the bottom cover should be large enough so that together, the top and bottom covers conformably surround the phone to be encased and allow for the cleaning cloth, if included. In one embodiment, the width of the back platform for the top 11 and bottom 12 covers is the same between the inner surfaces of the wall 22, 28, while the length of the back platform 27 of the bottom cover 12 is the same or shorter than the back platform 21 of the top cover 11. Accordingly, the combined unitary back platform 21, 27 can have measurements, including a length of at least 115.2 mm and a width of 58.6 mm. Other measurements are possible. The total back platform, including the top and bottom covers, should be large enough to support the mobile telephone when encased.

Ends of the wall 28 taper on an external surface from bottom to top at the straight edge end of the bottom cover 12 to conformably interconnect with the receiving end 24, which is tapered from top to bottom. An arm 31 extends from an inner surface of the wall 28 at each end 32 and extends beyond the straight edge end of back platform 27 of the bottom cover 12. A security member 16 can be affixed to an outer surface of at least one of the arms for connecting with the cutouts 25 on the receiving ends 24 of the top cover 11. The security members 16 are each shaped to fit within the security cutout 25 on the top cover 11.

Figure 3:
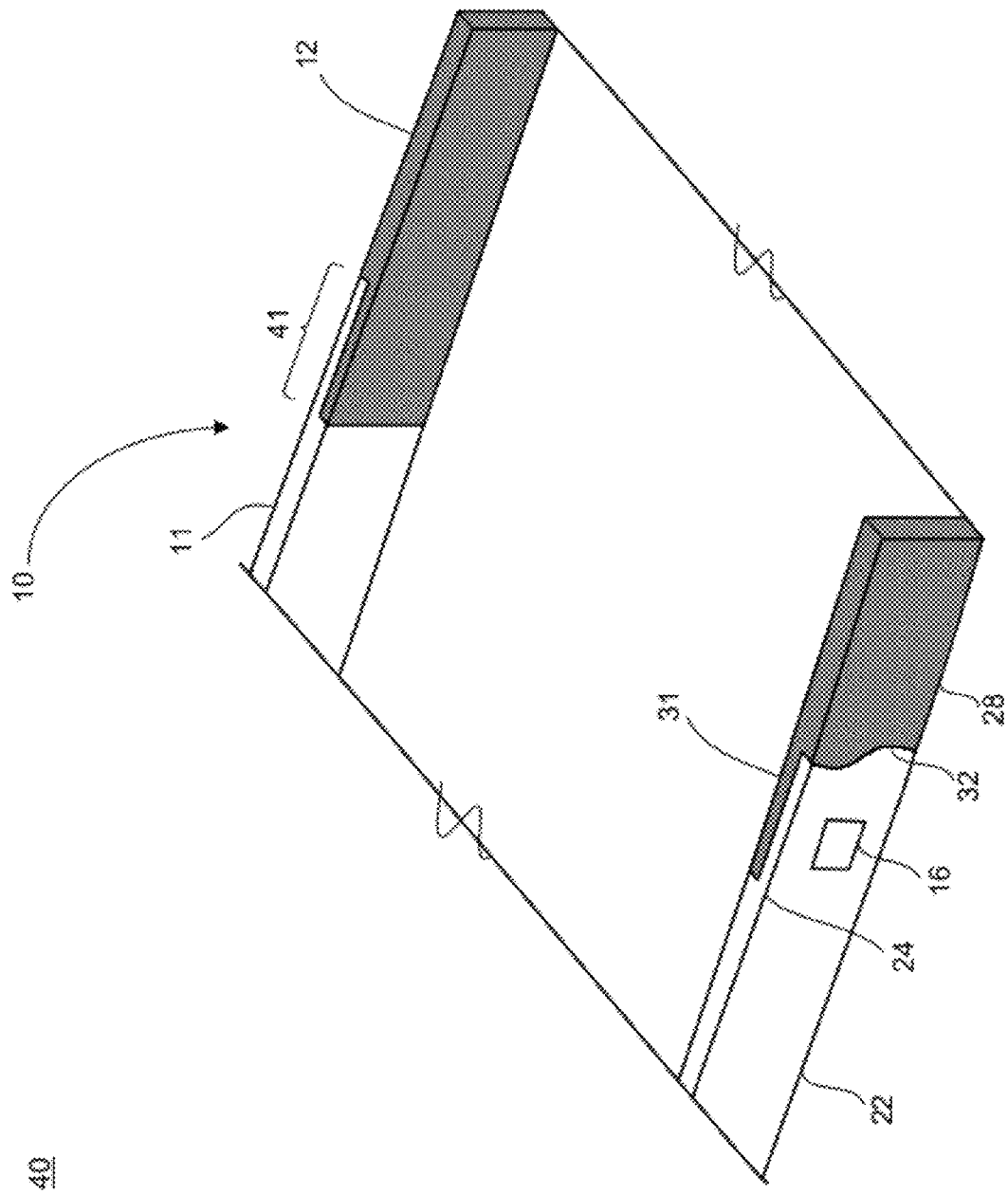
FIG. 3 is a perspective view showing interconnected top and bottom covers of the mobile telephone cleaning case of FIG. 1.

The arms 31 have a thinner width than the wall 28 and a void is formed between the outer surface of each arm 31 and the outer surface of the wall 28 to interconnect with the receiving ends 24 of the top cover 11. FIG. 3 is a perspective view showing an interconnection of top and bottom covers of the mobile telephone cleaning case of FIG. 1. When the mobile phone cleaning case 10 is in a closed position, the arms 31 and the receiving ends 24 are interconnected 41, such that they are adjacent to and beside one another with the receiving ends 24 coincident on an outer surface of the wall 22 and the arms 31 coincident with an inner surface of the wall 28. The arms 31 are formed on an end of each wall 28 and extend along an inner surface of the wall 28 beyond the straight edge end. The arms 31 have a smaller width than the wall 28, generating a void between the outer surface of the wall 28 and an outer surface of each arm 31. A width of the void can equal the width of the receiving end so that together, each pair of receiving end 24 and arm 31 can equal a width of the wall 22, 28 when interconnected 41. The end 32 of the wall 28 is tapered along an outer surface from bottom to top to conformably receive the receiving end 24, which is tapered on an outer surface from top to bottom. Other shapes for the bottom cover wall ends 32 and receiving ends 24 are possible, such as straight ends and rounded ends, which are described further below with reference to FIG. 6. In one embodiment, the ends of a wall of the top or bottom covers can be affixed to a ball, while a joint, such as a convex void is formed within the wall ends of the opposite cover. Together, the ball and joint interconnection of the top and bottom covers allows the covers to move with respect to one another. The security members 16 lock the interconnected top 11 and bottom 12 covers.

In a further embodiment, the mobile telephone cleaning case can be affixed such that the bottom cover includes the receiving ends, which can be rotatably affixed to an outer surface of arms that extend from the top cover.

Figure 4:
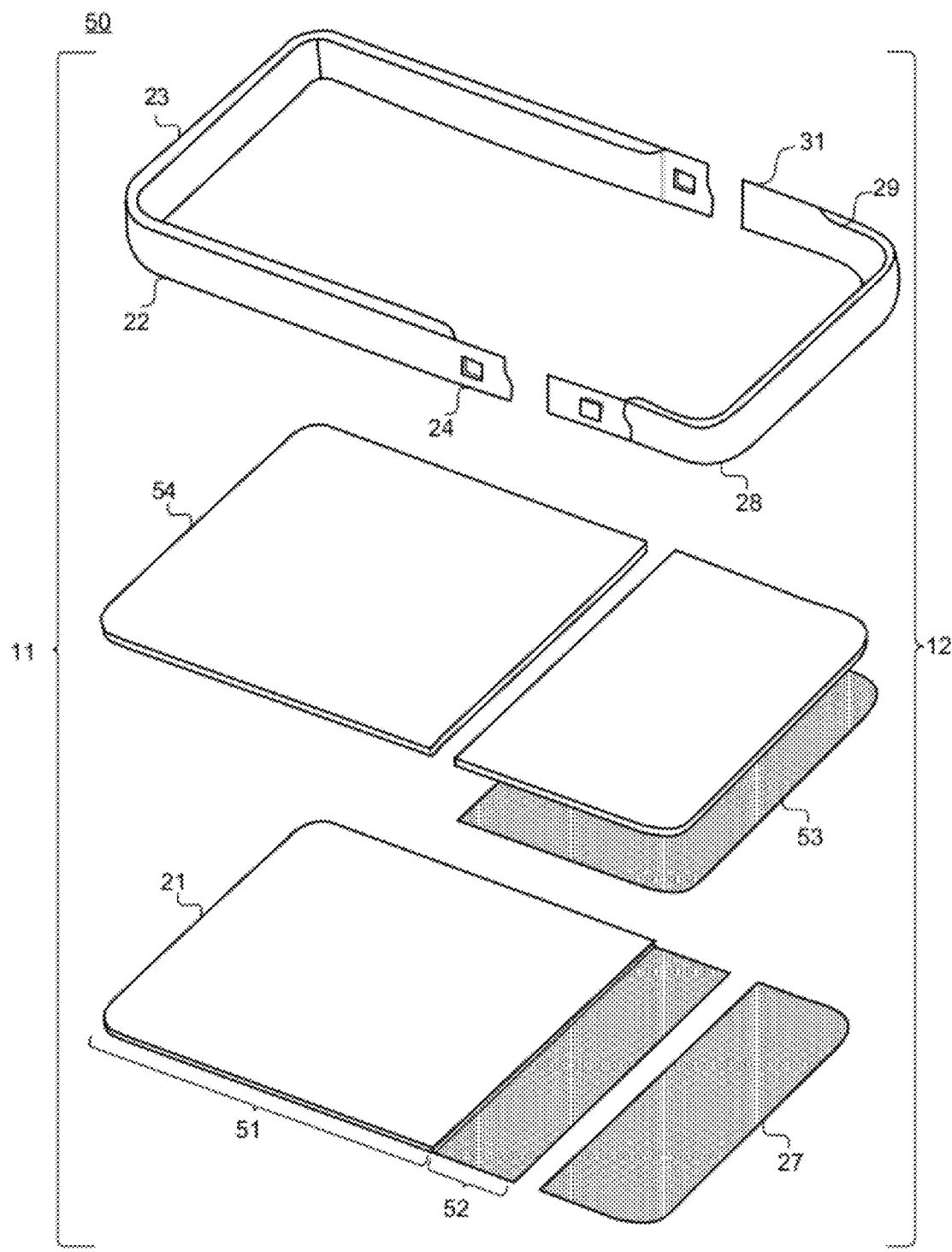
FIG. 4 is an exploded view of the mobile telephone cleaning case of FIG. 1.

The top and bottom covers can be movably affixed via a connecting member. FIG. 4 is an exploded view 50 of the mobile telephone cleaning case of FIG. 1. The top 11 and bottom 12 covers each include a back platform 21, 27 and a wall 22, 28. The back platform 21 of the top cover 11 includes an upper portion 51 and a connecting portion 52. The upper portion 51 extends from the rounded corners to the connecting portion 52, which extends along a common plane to the straight edge end of the back platform 21. The upper portion 51 of the back platform 21 can be made from a durable material, such as plastic, and can have a height that is taller than the connecting portion 52. In one embodiment, the plastic can have a height of 1 mm. Other materials and heights for the upper portion 51 of the top cover back platform 21 are possible.

The connecting portion 52 of the back platform 21 includes a layer of durable material, such as, but not limited to, plastic that is thinner than the upper portion 51 to create a void between a top surface of the upper portion 51 and a top surface of the connecting portion 52 that is sized to receive a connecting member 53. In one embodiment, a height of the connecting portion 52 is 0.5 mm. The length of the connecting portion 52 is dependent upon the size of the cleaning case and different types of connecting members 53 used to affix the top 11 and bottom 12 covers. The connecting member 53 affixes the top 11 and bottom 12 covers together to form a single case without loose parts that are required to be put together and taken apart. Application of the connecting member is further described below.

The wall 22 can be U-shaped and perpendicularly affixed along a portion of the perimeter of the back platform 21. The straight edge end of the back platform 21 remains open, without a wall. A height of the wall 22 is dependent on a depth of the mobile phone. However, at a minimum, the wall should be tall enough to extend to or above a top surface of the mobile device. In one embodiment, the height of the wall is 13.5 mm; however, other measurements are possible. An overhang 23 is perpendicularly affixed to the wall 22, opposite the back platform 21. The overhang 23 extends from the wall over a top surface of the back platform 21.

The bottom cover 12 also includes a back platform 27, wall 28, and overhang 29. The back platform 27 of the bottom cover 12 can be made from a durable material that is the same as or different from the material of the top cover 11. At least a portion of the durable material, nearest the straight edge of the back platform 27 of the bottom cover 12, has a height that is the same as the connecting portion 52 of the top cover 11, such as 0.5 mm as described above. The wall 28 is affixed around a perimeter of the back platform 27 of the bottom cover 12 on three sides, leaving only a straight edge end open. Arms 31 extend from an inner surface of each end of the wall 28 beyond the straight edge end. A width of each arm 31 is less than the wall to define a void between an outer surface of the arm 31 and an outer surface of the wall 28 to interconnect with the receiving ends 24 of the top cover 11. A security member can be formed on at least one of the arms and sized to fit within the cutout of the top cover 11, and locks the top 11 and bottom 12 cases together. When interconnected, the width of the arm and the receiving end equal the width of the wall, as described above with reference to FIG. 3.

The connecting member 53 is positioned over and affixed to the connecting portion 52 of the top cover 11 and at least a portion of the back platform 27 of the bottom cover 12 to prevent separation of the pieces and to provide rotation of the bottom cover 12 with respect to the top cover 11. The connecting member 53 can include a hinge or joint, or can be made of flexible, durable material, such as rubber, which allows movement of the top 11 and bottom 12 cases. The connecting member 53 can be affixed via adhesive, including glue, screws, tape, or other substances made from solutions such as epoxies, polyurethanes, silicones, and plastisols, as well as other solutions. Other connecting members and types of adhesive are possible. In one embodiment, the connecting member includes a flexible rubber layer 53 with a height of 0.5 mm that allows movement of the bottom cover by stretching downward, away from the top cover 11. In a further embodiment, the connecting member 53 can include a V-shaped groove to provide an axis of rotation for the bottom cover 12.

Once the connecting member 53 is affixed to the connecting portion 52 of the top cover 11 and the back platform 27 of the bottom cover 12, the heights of the upper portion 51, connecting portion 52, and bottom cover back platform 27 are equal to provide a level unitary back surface for affixation of a cleaning material 54. The cleaning material 54 should be large enough to cover the inner surface of the unitary back platform of the top 11 and bottom 12 covers. The cleaning material 54 can be made from microfiber, cotton and chamois, and can be affixed via an adhesive, including glue and tape. Other cleaning cloth materials and adhesives are possible. The cleaning cloth can include a single piece of material or multiple pieces of material. For example, a first piece of the cleaning cloth 54 covers the upper portion 51 and connecting member 53 affixed to the connecting portion 52 of the top cover 11 and a second piece of the cleaning cloth 54 covers the connecting member 53 affixed to the back platform 27 of the bottom cover 12. A thickness of the cleaning cloth can vary, but in one embodiment, the height is 1 mm.

Figure 5:
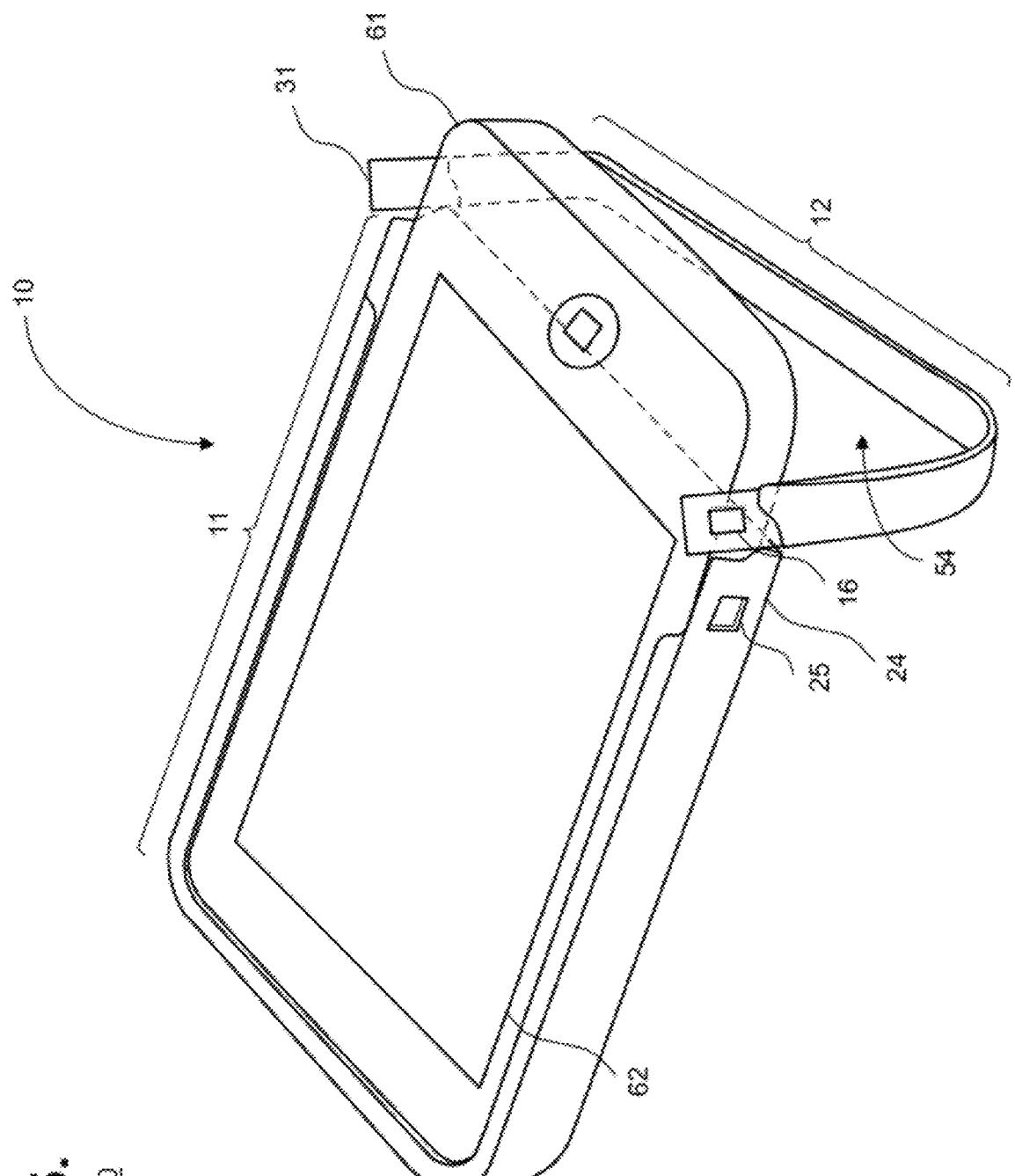
FIG. 5 is a perspective view showing the mobile telephone cleaning case of FIG. 1 in an open position.

To access the cleaning cloth, a user first opens the case and removes the mobile phone. FIG. 5 is a perspective view 60 showing the mobile telephone cleaning case of FIG. 1 in an open position. To open the mobile phone case 10, the user squeezes the security members 16 that are securely positioned within the cutouts 25 of the receiving arms 24 of the top cover 11 and removes the security members 16 from the security cutouts 25 to allow the bottom cover 12 to rotate downwards, away from the top cover 11. Once the security members are released, the rounded end of the bottom cover 12 pivots downward away from the top cover 11 to allow the user to slide a mobile phone 61 out of the top cover 11. The user then flips the mobile phone 61 over so that a display screen 62 on the mobile phone 61 faces downward toward the cleaning cloth 54 in the top cover 11, and inserts the phone in the top cover 11. To clean the screen 62, the user slides the mobile phone 61 back and forth along the cloth 54. Upon completion, the user removes the mobile phone 61 from the top cover 11, flips the phone 61 over so the screen faces up toward the user, and slides the phone 61 into the top cover 11 leaving the newly cleaned screen 62 exposed and accessible to the user. The user rotates the bottom cover 12 up until the back platform of the top 11 and bottom 12 covers are positioned along a common plane. The security members 16 slide and snap into the cutouts 25 to lock the top and bottom covers securely around the mobile phone 61.

Figure 6:
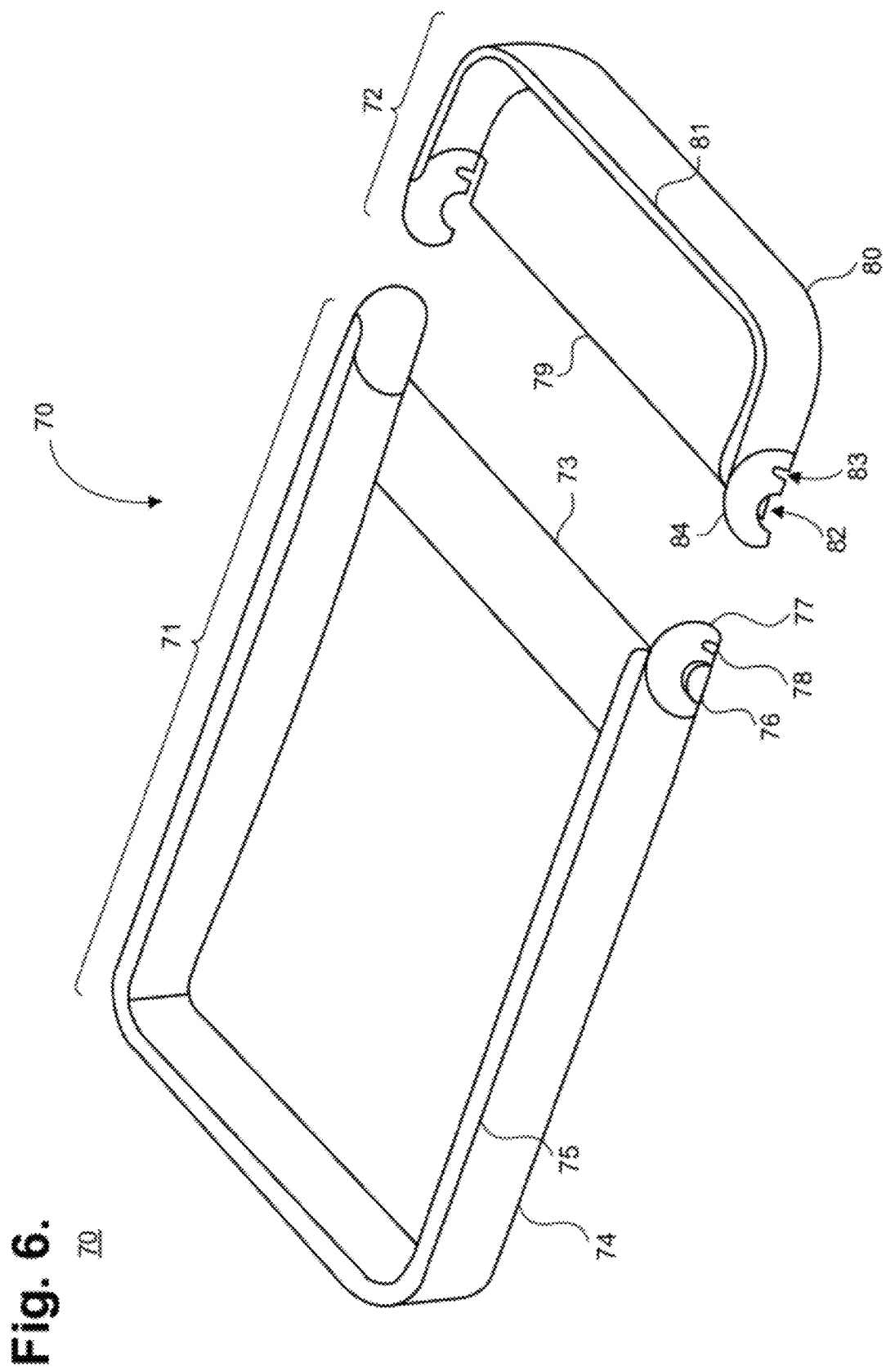
FIG. 6 is a perspective view showing a mobile telephone cleaning case, in accordance with a further embodiment.

A further embodiment of the mobile phone cleaning case includes rounded receiving ends and arms, which are each affixed to one of the top and bottom covers. FIG. 6 is a perspective view showing a mobile telephone cleaning case 70, in accordance with a further embodiment. The mobile telephone cleaning case 70 includes a top cover 71 and a bottom cover 72. The top cover 71 includes a back platform 73 with two rounded corners on one end and an opposite end having a straight edge. A U-shape wall 74 is perpendicularly affixed around a perimeter, along three sides of the back platform 73. Arms 77 are formed at the ends of the U-shape wall 74 and extend along an inner surface of the wall 74 past the straight edge of the back platform 73. The arms 77 can be shaped as half circles, as well as other shapes. A width of each arm 77 is less than a width of the wall 74 forming a void between an outer surface of the arm 77 and an outer surface of the wall 74, which is sized to receive the bottom cover 72.

A pivot mount 76 can be affixed to an outer surface of at least one of the arms 77, adjacent to a security member 78, which is also affixed to the outer surface of the arm 77. The pivot mounts 76 can be formed in the shape of a half circle and extend outward away from the outer surface of the receiving end. Further, the security member 78 can also be shaped as a half circle or oval. Other shapes of the pivot mounts and security members are possible. However, at a minimum, the pivot mounts must allow the top cover 71 and the bottom cover 72 to rotate away from each other. In one embodiment, the pivot mounts 76 extend away from the arm 77 at a greater distance than the security members 78. However, the pivot mounts 76 can also be smaller than, the same size as, or extend away from the arm at a shorter distance than the security members 78.

The bottom cover 72 includes a substantially flat back platform 79 with two rounded corners on one end and an opposite end with a straight edge. A U-shape wall 80 is perpendicularly affixed around a perimeter, along three sides of the back platform 79, leaving the straight edge open. A receiving end 84 is formed along an outer surface of each end of the wall 80 in the shape of a half circle that extends past the straight edge end. The receiving ends 84 each have a width that is smaller than the wall 80, such that a combined width of the receiving end 84 and arm 77, when adjacently positioned, are equal to the width of the walls 74, 80 of the top 71 and bottom 72 covers. A half-circle shaped notch 82 is formed within at least one of the receiving ends 84. The notch 82 is sized to conformably fit and rotate about the pivot mounts 76 of the top cover 71. A security cutout 83 is also formed within at least one of the receiving ends 84 and can be positioned adjacent to the pivot notch 82, such that the pivot notch 82 aligns with the pivot mount 76 and the security cutout 83 aligns with the security member 78 when each receiving end 84 is adjacently positioned with the arm 77 to lock the mobile telephone cleaning case.

The top 71 and bottom 72 covers are positioned such that the straight edge of the top cover back platform 73 is adjacent to and aligned with the straight edge of the bottom cover back platform 79 to form a unitary back platform, as shown in FIG. 1. The covers 71, 72 can be affixed via a connecting member (not shown), which can include a hinge, joint, or flexible material, such as rubber, which allows movement of the covers, as described above in detail with respect to FIG. 4. The connecting member can be affixed to at least a portion of the unitary back platform via adhesive, including glue or screws. Other connecting members and types of adhesive are possible. Specifically, the connecting member is affixed to a portion of the top cover back platform 73 nearest the straight edge and at least a portion of the bottom cover back platform 79.

In one embodiment, the back platform 73 of the top cover 71 includes an upper portion and a connecting portion. The upper portion extends from the rounded corners to the connecting portion, which extends along a common plane to the straight edge end of the back platform 73. The upper portion of the back platform 73 can be made from a durable material, such as plastic and can have a height that is taller than the connecting portion. Other materials are possible. In one embodiment, the plastic can have a height of 1 mm. The connecting portion of the back platform 73 can also be formed from a durable material, but is thinner than the upper portion to create a void between a top surface of the upper portion and a top surface of the connecting portion that is sized to receive the connecting member. In one embodiment, a height of the connecting portion is 0.5 mm.

At least a portion of the bottom cover back platform 79, nearest the straight edge end, can be made from a durable material and have a height that is the same as the connecting portion of the top cover, such as 0.5 mm as described above. The connecting member is positioned over and affixed to the connecting portion of the top cover 71 and at least a portion of the back platform 79 of the bottom cover 72 to prevent separation of the two covers and to allow the bottom cover to pivot and rotate with respect to the top cover 71. In one embodiment, the connecting member has a height of 0.5 mm. Other measures for the back platforms of the top and bottom covers, and the connecting member are possible. However, at a minimum, the height of the upper portion, connecting portion and connecting member, and bottom cover back platform and connecting member should be equal or substantially equal to provide a flat surface for the cleaning cloth (not shown) to be affixed.

The cleaning cloth should be large enough to cover the inner surface of the unitary back platform. The cleaning cloth can be formed from one or more pieces. In a further embodiment, the cleaning cloth extends to cover an inner surface of the walls. A thickness of the cleaning cloth can vary, but in one embodiment, the height is 1 mm.

To clean a mobile phone, the user opens the mobile telephone cleaning case by applying pressure to the security members 78 and pushing the security members 78 inwards so that the security cutouts 83 can slide over the security members, which allows the bottom cover 72 to rotate away from the top cover 71 via the pivot mounts 76. In a further embodiment, the user can also apply pressure to the pivot mounts to open the cleaning case. The user can close the mobile telephone cleaning case by positioning the mobile phone within the top cover between the back platform 73 and overhang 75 and moving the bottom cover 72 upward until a back surface of the bottom cover back platform 79 is aligned along a common plane with a back surface of the top cover back platform 73. Once completely closed, the security members 78 are pressed inward to fit within the security cutouts 83 to lock the cleaning case in the closed position.

Figure 7:
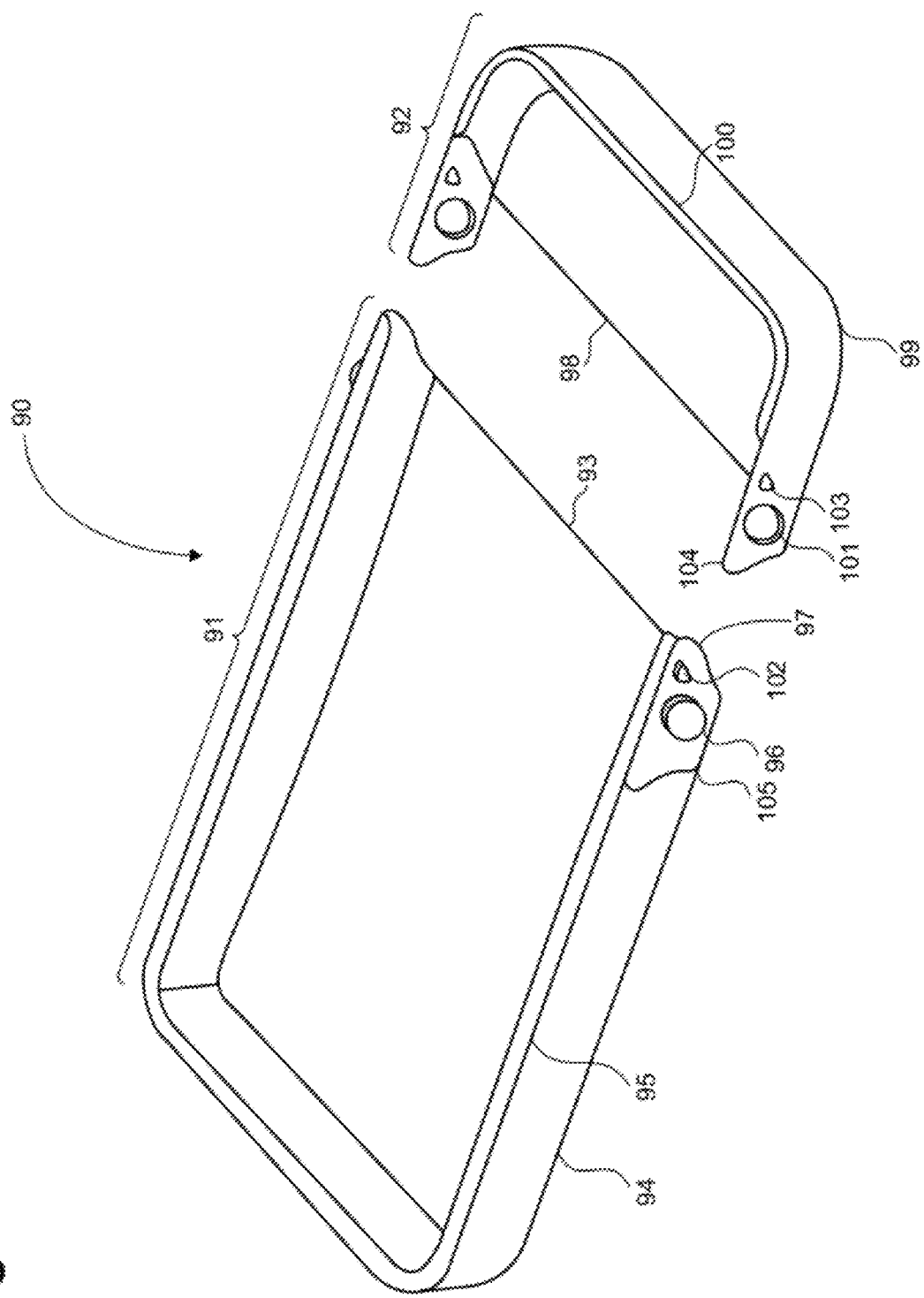
FIG. 7 is a perspective view showing a mobile telephone cleaning case, in accordance with a further embodiment.

In yet a further embodiment, the top and bottom covers of the mobile telephone cleaning case are affixed via pivot mounts only, rather than by a connecting member. FIG. 7 is a perspective view showing a mobile telephone cleaning case 90, in accordance with a further embodiment. The mobile telephone cleaning case 90 includes a top cover 91 affixed to a bottom cover 92 via two pivot mounts 96. The top cover 91 includes a substantially flat back platform 93. A rounded end of the back platform 93 includes two rounded corners, while the opposite end is a straight edge. A size of the back platform 93 is dependent upon a size of the mobile phone to be encased. However, at a minimum, the back platform 93 should be at least as large as the display screen on the mobile phone. In one embodiment, the top cover is made from a durable material, such as plastic, and the back platform can have a height of 1 mm.

A U-shape wall 94 is perpendicularly affixed along a portion of the back platform 93 perimeter. Specifically, the wall 94 originates at a point 105 on one side of the back platform 93 between the rounded end and the straight edge, and extends along the perimeter around the rounded corners to a further point on the opposite side between the rounded end and the straight edge. Each end of the wall can taper from bottom to top on an outer surface. The straight edge of the back platform 93 remains open, without a wall. A height of the wall 94 is dependent on a depth of the mobile phone. However, at a minimum, the wall 94 should be tall enough to extend to or rise above a top surface of the mobile device.

Arms 97 extend from each of the points 105, along an inner surface of the wall 94 and travel along the perimeter of the back platform 93 to the straight edge. A width of each arm 97 is thinner than a width of the wall 94, forming a void between an outer surface of each arm 97 and an outer surface of the wall 94, which is sized to receive the bottom cover 92. The arms 97 can be tapered from top to bottom to interlock with oppositely tapered receiving ends 104 of the bottom cover 92. A pivot mount 96 is affixed to an outer surface of each arm 97. The pivot mounts 96 can be formed in the shape of a circle and extend outwards away from the outer surface of the arm 97. The pivot mounts 96 allow the top 91 and bottom 92 covers to rotate with respect to one another. Additionally, a security member 102 is formed on each arm 97 adjacent to the pivot mount 96. The security members 102 can include a button, latch, or lock, which allows a user to secure the top and bottom covers in a closed position, as well as to open the case by moving the bottom cover away from the top cover when the security member 102 is released. An overhang 95 is perpendicularly affixed to the wall 94 and the arms, opposite the back platform 93. Additionally, the overhang 95 extends over a top surface of the back platform 93 of the top cover 91. When encased, the overhang 95 covers a portion of the top surface of the mobile phone.

The top cover 91 can be interconnected to the bottom cover 92 via the pivot mounts 96. The bottom cover 92 includes a back platform 98, a wall 99, and an overhang 100. The bottom cover back platform 98 includes one end with two rounded corners and a straight edge end. The straight edge of the bottom cover back platform 98 is positioned adjacent to the straight edge of the top cover back platform 93 to form a unitary back platform of the mobile telephone cleaning case 90. The bottom cover back platform 98 is sized based on the back platform 93 of the top cover. The length of the bottom cover back platform 98 can be the same or shorter than the top cover back platform 93. At a minimum, the unitary back platform should be large enough to support the mobile telephone when encased. The back platform 98 of the bottom cover 92 can be made from durable material, such as plastic, and can have a height that is the same as the height of the top cover back platform 93 to form a level surface for affixing a cleaning cloth (not shown).

A U-shape wall 99 can surround a portion of the bottom cover back platform 98 perimeter, leaving only the straight edge without a wall. A receiving end 104 extends from an outer surface of both ends of the wall 99 beyond the straight edge of the back platform 98. A pivot notch 101 and a security cutout 103 are formed within each receiving end 104, which tapers from top to bottom at the straight edge of the bottom cover 92. A width of the receiving ends is thinner than the wall 99, which forms a void between an inner surface of each receiving end 104 and the inner surface of the wall 99 to receive the arms 97 of the top cover 91. Together, a width of the receiving end and arm equal the width of the wall 94, 99.

When the receiving ends 104 and arms 97 are adjacent to one another, the pivot mounts 96 are conformably received within the pivot notches 101 and the security members 102 are conformably received within the security cutouts 103. Both the pivot mounts 96 and the security members 102 extend away from the wall, through the pivot notches and security cutouts, respectively, and end outside the pivot notches and security cutouts to allow a user to apply pressure to the pivot mounts and security members. An overhang 100 can be perpendicularly affixed to the wall 99, opposite the back platform 98. However, the overhang must be small enough to prevent covering a display face of the mobile telephone.

In a closed position, the arms and the receiving ends are adjacent to one another and together, equal the width of the wall 94, 99, as described above with reference to FIG. 3. The receiving ends 104 of the bottom cover 92 each extend over the outer surface of the arms 97 and the pivot notches 101 receive the pivot mounts 96. In one embodiment, the pivot notches 101 are permanently affixed to the pivot mounts 96. In a further embodiment, the pivot notches 101 can be removably affixed to the pivot mounts 96.

To open the cleaning case, a user applies pressure to the security members 102 and pushes the security members 102 inwards so that the security cutouts 103 can slide over the security members allowing the bottom cover 92 to rotate away from the top cover 91 via the pivot mounts 96. Oppositely, the user can close the mobile telephone cleaning case 90 by positioning the mobile phone within the top cover 91 between the back platform 93 and overhang 95 and by moving the bottom cover 92 upward until a back surface of the bottom cover back platform 98 is aligned along a common plane with a back surface of the top cover back platform 93. Once completely closed, the security members 102 are depressed to fit within and extend out of the security cutouts 103 to lock the cleaning case 90 in the closed position.

A connecting member is not required, as the pivot mounts allow the bottom cover to open by rotating downwards from the top cover. A cleaning cloth is affixed to the unitary back platform formed by the top and bottom covers. The cleaning cloth can include one or more pieces. In a further embodiment, the cleaning cloth is also affixed to an inner surface of the walls.

In yet a further embodiment, various shaped cutouts can be formed within the back platform and walls of the top and bottom covers of the mobile telephone case to allow a user to access buttons, ear piece site, memory card sites, and battery charging sites formed on or within a mobile phone to be encases. Other cutouts are possible.

Although the case has been described above for use with a mobile telephone, other mobile devices are possible, including laptops, PDAs, MP3 players, and GPS devices. Additionally, the cleaning case can be used for other devices, such as glasses, magnifying glasses, jewelry, and watches.

While the invention has been particularly shown and described as referenced to the embodiments thereof, those skilled in the art will understand that the foregoing and other changes in form and detail may be made therein without departing from the spirit and scope of the invention.

What is claimed is:

1. A mobile telephone case, comprising:
    an open face top cover having a back platform with raised sides along three of four edges and dimensioned to receive a mobile device;
    a bottom cover comprising a further back platform with further raised sides along three of four edges and that is rotatably affixed to the fourth edge of the open face cover such that the raised sides align with the further raised sides;
    a flexible rubber layer affixed to a top surface of the back platform of the top cover and further affixed to a top surface of the further back platform of the bottom cover, wherein the flexible rubber layer extends when the bottom cover rotates away from the top cover; and
    at least one cleaning cloth sized to cover the back platform of the top cover and affixed to a top surface of the flexible rubber layer on the top cover.

2. A mobile telephone case according to claim 1, wherein the cleaning cloth is affixed to an inner surface of the raised sides and the further raised sides.

3. A mobile telephone case according to claim 1, further comprising one or more of:
    an overhang perpendicularly affixed to at least one of the raised sides of the top cover opposite the back surface; and
    an overhang perpendicularly affixed to at least one of the further raised sides of the bottom cover opposite the further back surface.

4. A mobile telephone case according to claim 1, further comprising:
    at least one security member formed on an end of one of the raised sides and the further raised sides to connect the raised sides and further raised sides.

5. A mobile telephone case according to claim 4, further comprising:
at least one security recess formed within a corresponding end of the other of the raised sides and the further raised sides, and shaped to receive the security member.

6. A mobile telephone case according to claim 1, further comprising:
a receiving end comprising a substantially flat surface and extending from each end of one of the raised sides and the further raised sides.

7. A mobile telephone case according to claim 6, further comprising:
an arm comprising a substantially flat surface and extending from the ends of the other raised sides and the further raised sides, wherein the arms are positioned adjacent to the receiving ends when the open face top cover and the bottom cover are in a closed position.

8. A mobile telephone case according to claim 7, wherein each of the arms and receiving ends comprise one of a half circle shape, a rectangular shape, and a ball and joint.

9. A mobile telephone case according to claim 7, further comprising:
a pivot mount affixed to one of the arms and the receiving ends; and
a notch formed on the other of the arms and receiving ends and shaped to conformably receive the pivot mount.

10. A method for constructing a mobile telephone case, comprising:
providing an open face top cover having a back platform with raised sides along three of four edges and dimensioned to receive a mobile device;
rotatably affixing a bottom cover comprising a further back platform with further raised sides along three of four edges to the fourth edge of the open face cover via a connecting member such that the raised sides align with the further raised sides;
connecting the top and bottom covers by affixing a flexible rubber layer to a top surface of the back platform of the top cover and further affixing the rubber layer to a top surface of the further back platform of the bottom cover, wherein the flexible rubber layer extends when the bottom cover rotates away from the top cover; and
affixing at least one cleaning cloth sized to cover the back platform of the top cover to a top surface of the flexible rubber layer on the top cover.

11. A method according to claim 10, wherein the cleaning cloth is affixed to an inner surface of the raised sides and the further raised sides.

12. A method according to claim 10, further comprising one or more of:
perpendicularly affixing an overhang to at least one of the raised sides of the top cover opposite the back surface; and
perpendicularly affixing an overhang to at least one of the further raised sides of the bottom cover opposite the further back surface.

13. A method according to claim 10, further comprising:
forming at least one security member on an end of one of the raised sides and the further raised sides to connect the raised sides and further raised sides.

14. A method according to claim 13, further comprising:
forming at least one security recess within a corresponding end of the other of the raised sides and the further raised sides, wherein the at least one security recess is shaped to receive the security member.

15. A method according to claim 10, further comprising:
forming a receiving end comprising a substantially flat surface on each end of one of the raised sides and the further raised sides.

16. A method according to claim 15, further comprising:
forming an arm comprising a substantially flat surface on the ends of the other raised sides and the further raised sides, wherein the arms are positioned adjacent to the receiving ends when the open face top cover and the bottom cover are in a closed position.

17. A method according to claim 16, wherein each of the arms and receiving ends comprise one of a half circle shape, a rectangular shape, and a ball and joint.

18. A mobile telephone case according to claim 16, further comprising:
affixing a pivot mount to one of arm arms and the receiving ends; and
forming a notch shaped to conformably receive the pivot mount, on the other of the arms and receiving ends.

19. A mobile telephone case according to claim 1, further comprising one of:
the cleaning cloth further sized to cover the further back platform of the bottom cover and affixed to the flexible rubber layer on the bottom cover; and
a further cleaning cloth sized to cover the further back platform of the bottom cover and affixed to the flexible rubber layer on the bottom cover.

20. A method according to claim 10, further comprising one of:
affixing the cleaning cloth further sized to cover the further back platform of the bottom cover to the flexible rubber layer on the bottom cover; and
affixing a further cleaning cloth sized to cover the further back platform of the bottom cover to the flexible rubber layer on the bottom cover.

* * * * *